J. BRENNER.
BELT COUPLING.
APPLICATION FILED MAY 29, 1908.
914,634.
Patented Mar. 9, 1909.
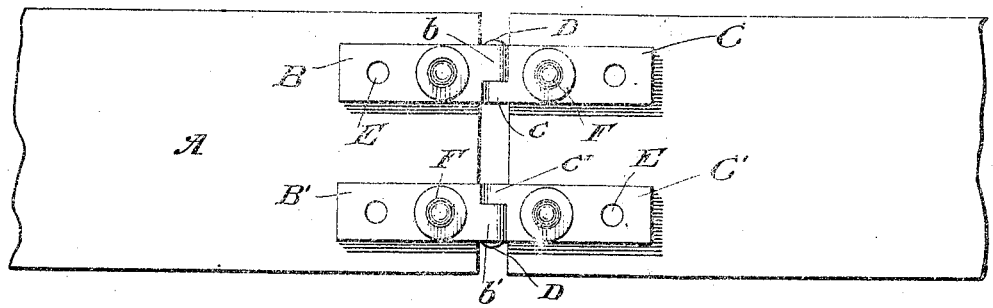
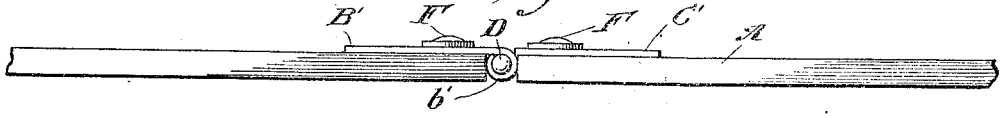
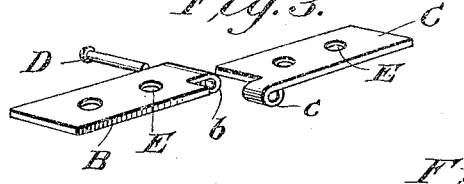
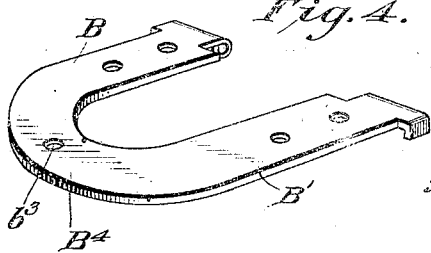
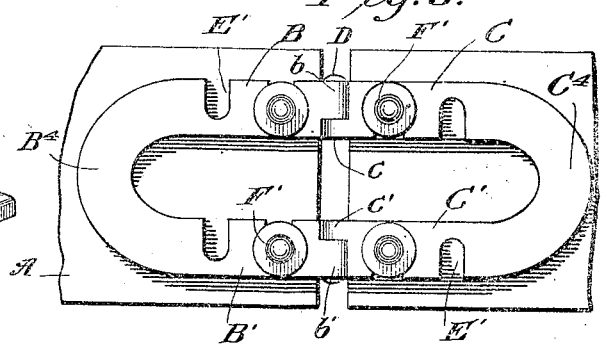
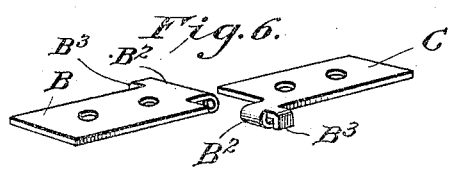
Witnesses
Inventor
Jacob Brenner
By
Attorney

UNITED STATES PATENT OFFICE.

JACOB BRENNER, OF PHILADELPHIA, PENNSYLVANIA, ASSIGNOR OF ONE-HALF TO JOHN WALKER CLARK, OF PHILADELPHIA, PENNSYLVANIA.

BELT-COUPLING.

No. 914,634.

Specification of Letters Patent.

Patented March 9, 1909.

Application filed May 29, 1908. Serial No. 435,748.

*To all whom it may concern:*

Be it known that I, JACOB BRENNER, a citizen of the United States, residing at Philadelphia, in the county of Philadelphia and State of Pennsylvania, have invented certain new and useful Improvements in Belt-Couplings, of which the following is a specification.

My invention relates to belt couplings, and more particularly to hinged or pivoted couplings, the object of the invention being to provide a coupling of this character, of simple construction, which can be easily stamped from sheet metal and be readily adjusted to the width of the belt, and which will have sufficient longitudinal strength to withstand all strains and stresses thereon.

In the accompanying drawings Figure 1 is a plan view of the outer face of a belt with one form of my coupling applied thereto. Fig. 2, is an edge view of the belt coupling. Fig. 3, is a perspective view of the coacting coupling members. Fig. 4, is a perspective view of a modification. Fig. 5, is a plan view of a modification, and Fig. 6, is a perspective of another modification.

Referring to Figs. 1, 2 and 3, B, B' designate the body portions of two separate coupling members adapted to be applied to the same end of a belt A. Each body portion has projecting from it the downwardly and inwardly turned sleeve $b$, or $b'$ formed by rolling an extension of the body portion blank around a mandrel. It is to be particularly noted that the sleeve portion is narrower than the body portion, that the two sleeves project downward between the edges of the ends of the belt, and that the two coupling elements on the same end of the belt are oppositely placed in regard to their sleeves, both of the sleeves being toward the margins of the belt as shown in Fig. 1. This arrangement gives greater strength in resisting lateral strains than if two like sections of couplings were arranged with the sleeves on the same side, as in this latter case any sidewise strain would not be resisted save by the overturned head of the pintle D. With my construction the lateral strain in either direction is resisted by the ends of the sleeve where they abut against each other, as well as by the pintle itself. C, C' designates the body portions of the two opposite coupling members having the downwardly and inwardly turned sleeves $c$, $c'$ oppositely disposed to the sleeves $b$, $b'$, and so arranged relatively to each other that the sleeves $c$, $c'$ shall be located interiorly or between the sleeves $b$, $b'$. D designates the pintles, one for each coupling having headed ends to prevent their accidental withdrawal.

I have shown in Fig. 6, a modified form of coupling member which will hold the pins in place without the necessity of their being headed, and which will permit the easy withdrawal of the pintles when desired. This modification consists in forming the sleeve $B^2$ with a lateral extension or ear $B^3$ adapted to be downwardly turned against the end of the sleeve after the pintle is in place. When it is desired to remove the pintle, this extension or ear $B^3$ is turned up on each of the coupling members, and the pintle pushed out, thus disengaging the two ends of the belt. This feature is also shown in Fig. 4.

It is to be noted that I provide a plurality of rivet holes E, one located behind the other for the rivets F. This permits the coupling member to be reset longitudinally on the belt to take up slack, without the necessity of making new rivet holes in the belt and thereby weakening it. Instead of the holes I may use the lateral extended recesses E' as shown in Fig. 5.

In Fig. 4, I show a modified form of coupler wherein the two body portions B, B' are connected at the extremities by a cross bar $B^4$. This acts to give a better engagement with the belt, while not preventing the belt and its coupling yielding to lateral flexing, for the reason that the metal between the two body portions, B, B' is cut away and thus the two arms so formed are, to a degree, elastically supported relatively to the cross bar $B^4$, so as to have a movement at right angles to the plane of the belt, independent of each other. The coacting member C, C' with its cross bar $C^4$ is constructed in the same manner as shown in Fig. 5. It is to be noted that the cross bar may be provided with a rivet hole $b^3$, whereby the cross bar may be fastened to the belt as shown in Fig. 4.

In Fig. 5, I show a coupling member of the same construction as in Fig. 4, but instead of having a series of rivet holes, it is provided with a series of notches or recesses E' to engage with the rivets F. The recesses are so arranged with their openings in the same direction, thus permitting the coupling member to be shifted laterally upon a slight loosening of the rivet and this will allow the coupling member to be removed very easily, and easily adjusted to take up the slack.

In the construction shown in Figs. 1, 2, and 3, the pins D will be held in place by reason of the great friction of the sleeve thereon, and when the device is new it would not be necessary to employ any other means for holding the pins, when the parts become worn however, it is advisable to employ additional securing means for the pins, as shown in Fig. 4, 5 and 6.

The advantages of my invention are as follows. The separate coupling members provide for a freedom of lateral movement or flexing, which is impossible with belts having wide bodied hinges extending across a large portion of the belt, or those wherein a plurality of short inter-engaging sleeves are used, the sleeves of opposite members inserted between and contacting with each other. By joining the separate bodies of the couplings by the cross bar, I secure a better attachment to the belt, while leaving the separate coupling members on the same side free to have independent movement, and avoid any chance of lateral stiffening or rigidity. The plurality of rivet holes permit the couplings to be adjusted so as to take up the slack of the belt, and the modified form shown in Fig. 6 will permit the pintles to be removed easily and will hold the pintles securely in position while in operation.

I am aware that hinged couplings have been heretofore devised, and these are not within the spirit of my invention. Such hinges stiffen the end of the belt too much, particularly in narrow belts and do not permit the belt to flex laterally as it should. It will be seen that in my invention narrow belts are not rigidly connected across their entire width, but only at points along the width of the belt, and that in all the embodiments which I have illustrated these separate hinge connections are practically independent of each other as far as lateral flexing goes.

Having thus described my invention what I claim as new and desire to secure by Letters Patent is:

1. In combination with two adjacent ends of a belt, parallel members secured to the face of the belt at both ends of the belt, and the opposite members of each pair located in alinement, downwardly projecting sleeves on all of said members at the ends of the belt, all of said sleeves in alinement, and both sleeves of the pair of members on one belt end located nearer the center of the belt, than are the sleeves of the other pair of members and the sleeves of one pair of members located against the sleeves of the other pair of members, and coupling pins in the adjacent sleeves of said members.

2. A coupling for belts comprising two members, each member having a body portion and a single downwardly projecting sleeve narrower than the body portion, said sleeve having at its outer end a downwardly extending ear covering the open end of the sleeve, and a pintle adapted to pass through both sleeves and to be held therein by the downwardly projecting ears on the sleeves.

3. In combination with two adjacent ends of a belt, parallel members secured to the face of the belt at both ends thereof, and the opposite members of each pair located in alinement, downwardly projecting sleeves on all of said members at the ends of the belt, all of said sleeves in alinement, coupling pins in the adjacent ends of the pairs of sleeves and downwardly projecting ears on one of said pairs of members covering the openings in the ends of the sleeves and projecting over the end of the coupling pins.

In testimony whereof I have signed my name to this specification in the presence of two subscribing witnesses.

JACOB BRENNER.

Witnesses:
 F. WALKER CLARK,
 F. B. WRIGHT.